United States Patent [19]

Mareydt

[11] Patent Number: 4,487,348
[45] Date of Patent: Dec. 11, 1984

[54] ADJUSTABLE AND REMOVABLE CROSS RAIL

[75] Inventor: Ray G. Mareydt, Warren, Mich.

[73] Assignee: Four Star Corporation, Troy, Mich.

[21] Appl. No.: 523,025

[22] Filed: Aug. 15, 1983

Related U.S. Application Data

[63] Continuation of Ser. No. 311,688, Oct. 15, 1981, abandoned.

[51] Int. Cl.³ .................................................. B60R 9/04
[52] U.S. Cl. ...................................... 224/321; 224/309
[58] Field of Search ................. 224/321, 322, 324, 325, 224/323, 330, 326, 316, 917, 331, 309; 410/8; 280/35, 769; 248/216.4, 221.3, 222.1, 225.3 R, 225.3 A, 226.3, 226.2, 244, 297.2; 296/3; 211/18

[56] References Cited

U.S. PATENT DOCUMENTS

| | | | | |
|---|---|---|---|---|
| Re. 26,539 | 3/1969 | Bott | | 224/321 |
| 1,239,595 | 9/1917 | Hawthorne | | 248/226.2 |
| 1,368,957 | 2/1921 | Miller | | 248/226.2 |
| 3,325,067 | 6/1967 | Helm | | 224/321 |
| 3,545,660 | 12/1970 | Stephen | | 224/321 |
| 4,239,138 | 12/1980 | Kowalski | | 224/325 |
| 4,295,588 | 10/1981 | Kowalski et al. | | 224/325 |

FOREIGN PATENT DOCUMENTS

| | | | |
|---|---|---|---|
| 2932874 | 9/1980 | Fed. Rep. of Germany | 224/321 |
| 285977 | 1/1953 | Switzerland | 211/18 |
| 365959 | 1/1963 | Switzerland | 224/325 |

Primary Examiner—Stephen Marcus
Assistant Examiner—Robert Petrik
Attorney, Agent, or Firm—Cullen, Sloman, Cantor, Grauer, Scott & Rutherford

[57] ABSTRACT

An external cargo carrier for a vehicle and which carrier includes a mechanism allowing longitudinal adjustment of a cross rail relative to a pair of transversely spaced side rails and which mechanism also permits the cross rail to be quickly and easily removed from the side rails.

10 Claims, 7 Drawing Figures

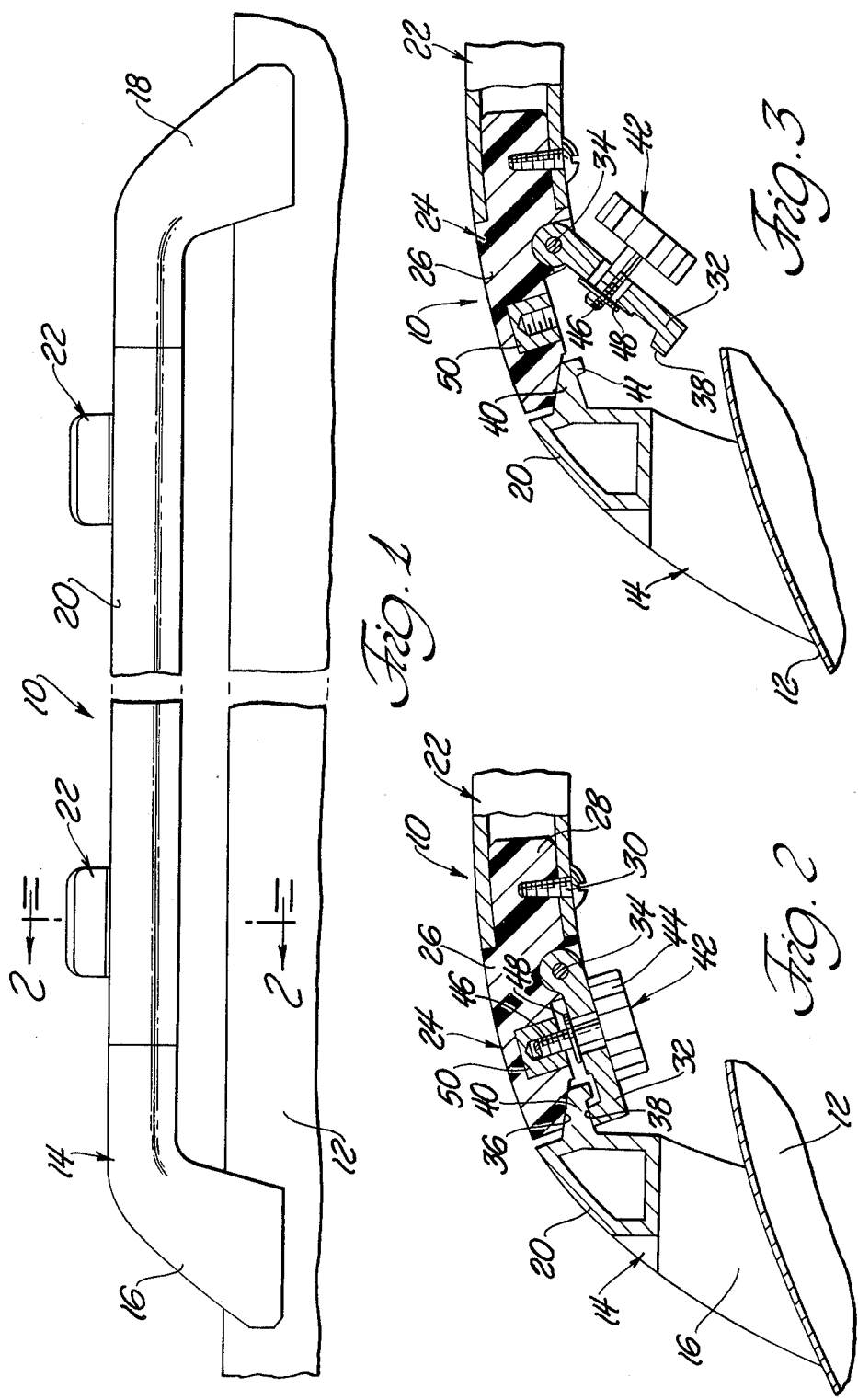

ADJUSTABLE AND REMOVABLE CROSS RAIL

This application is a continuation of application Ser. No. 311,688, filed Oct. 15, 1981, now abandoned.

TECHNICAL FIELD

The present invention relates to an article carrier adapted to be mounted on an exterior surface of a vehicle and, more particularly, a carrier of the type comprising a pair of side rails normally mounted longitudinally of the vehicle center line and which side rails are adapted to have one or more cross rails supported therebetween. Further, the carrier is of the type wherein the cross rails are supported upon the side rails through end brackets which permit the cross rails to be adjusted longitudinally of the vehicle.

Such adjustable cross rails normally are utilized to permit adjusting the space between cross rails to accommodate different size loads to be carried upon or within the article carrier.

As vehicles have been reduced in size to increase fuel efficiency, internal cargo carrying space has correspondingly been reduced thereby increasing the need for such outside mounted article carriers. Since fuel efficiency is an important consideration in designing today's vehicles, one of the disadvantages of such outside mounted article carriers or luggage racks is their aerodynamic drag. While such drag cannot be avoided when it is necessary to carry articles on the outside of the vehicle, a large percentage of the time that a vehicle is being operated there are no such outside mounted articles or loads being carried.

Accordingly, it is the object of the present invention to provide an article carrier device wherein that portion of the carrier creating the most aerodynamic drag can be quickly and conveniently removed from the vehicle when it is unnecessary to carry any external articles within or upon the carrier.

BACKGROUND ART

It is known in the prior patented art to utilize article carriers having longitudinally adjustable cross rails. Such carriers are shown, for example, in the following representative patents: French Pat. No. 1,092,494; U.S. Pat. Nos. 1,780,277 Seeley et al; 3,253,755 Bott; Re. 26,538 Bott; Re. 26,539 Bott; 4,132,335 Ingram; 4,239,138 Kowalski.

While it is possible with most outside mounted article carriers to remove all or parts of such carriers, such is not easily accomplished and, in general, once such racks or article carriers have been mounted on a vehicle outer surface they are intended to remain thereon in their entirety whether or not articles are being carried.

While not incorporating adjustable cross rails, U.S. Pat. No. 4,162,755 Bott teaches the use of a luggage rack intended to be removed in its entirety from the roof of a vehicle. It is apparent that in the concept taught in the latter Bott patent or in other prior art teachings, there is a problem of conveniently storing the rack or a part thereof once it is removed from the vehicle surface and, at the same time, having such readily available for reinstitution when it is desired to carry an article exteriorly of the vehicle.

DISCLOSURE OF THE INVENTION

There are numerous problems with prior art outside mounted article carriers which have been overcome by the present invention. First, it has been determined that most of the aerodynamic drag of an unloaded article carrier or rack is created by the transversely extending cross rail members which are normal or at right angles to air flow over the vehicle surface. In other words, very little drag is attributable to the longitudinally extending side rails which are positioned in the direction of air flow and have a relatively small cross sectional area exposed to the air flowing over the vehicle. Further, the drag and/or turbulence of such side rails is less when the exterior surface of such side rails is continuous or unslotted.

Heretofore, many of the prior art article carriers or racks have been formed with open slots or channels cut therethrough thus making their outer surfaces discontinuous. Such open channels or slots have numerous disadvantages. First, such an open channel or slot weakens the cross sectional strength of the side rail requiring the same to be of a heavier gauge or configuration than would otherwise be necessary if it were unslotted. Next, such a slot or channel permits air to flow through the side rail, contributing to air turbulence thereby increasing aerodynamic drag and often making undesirable noise.

By utilizing a non-slotted or closed side rail in combination with a unique cross rail supporting bracket, applicant provides a vehicle article carrier or storage rack wherein the cross rails may be quickly and conveniently removed and easily stored within the vehicle until such time as it is necessary to remount the cross rails for the purpose of carrying exterior loads. While applicant is not the first to employ an unslotted or closed side rail in an article carrier, see the aforecited French Pat. No. 1,092,494, he is the first to utilize such a side rail in combination with a quick disconnect mechanism for easy removal and remounting of cross rails.

Applicant's outside mounted article carrier includes a pair of non-slotted side rails normally mounted upon and above the vehicle surface and parallel to the longitudinal center line of the vehicle. One or more cross rails extend transversely between the side rails and are supported thereon by end brackets including means for permitting longitudinal adjustment of the cross rails relative to the side rails.

More specifically, applicant's unique end brackets include first and second members adapted to clampingly engage therebetween at least a portion of the outer surface of the side rail. Further, each end bracket includes means for adjusting the distance between the first and second bracket members in such a way as to vary the clamping engagement with the side rail and also to permit one of the members to be easily moved totally out of engagement with the side rail to permit the end brackets and cross rail to be simply removed from the side rails when no external articles or luggage are being carried.

Various modifications of the invention are set forth in the drawings and the detailed description which follows.

BRIEF DESCRIPTION OF DRAWINGS

FIG. 1 is a side elevational view of an article carrier embodying the subject invention and mounted on a vehicle surface;

FIG. 2 is a cross sectional view along lines 2—2 of FIG. 1;

FIG. 3 is a side elevational view similar to FIG. 2, however, showing one of the cross rail bracket members in an open position permitting easy removal of the cross rail and end brackets;

BEST MODE FOR CARRYING OUT THE INVENTION

Figure 4:
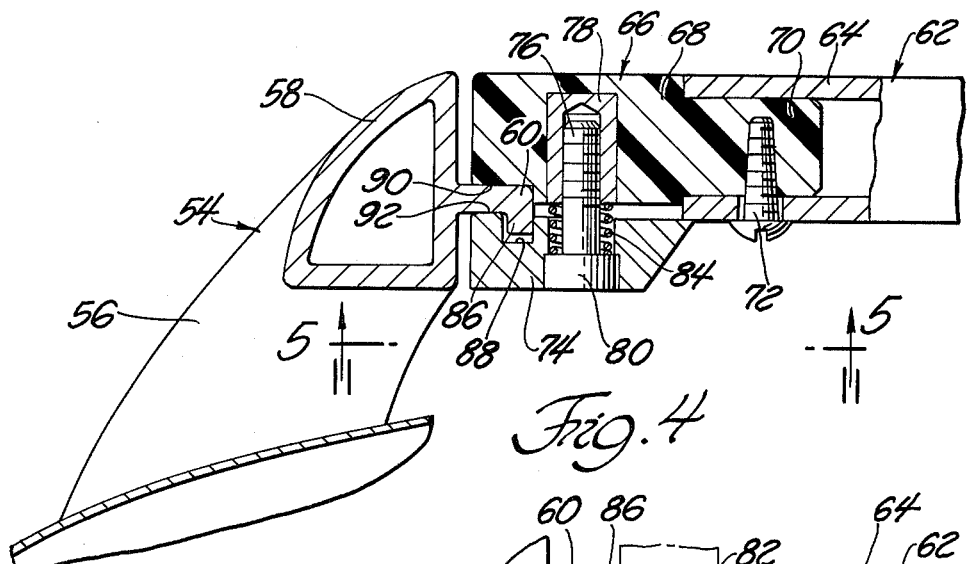
FIG. 4 is a partially cross sectional view of a second modification of the subject invention.

Referring to the first modification shown in FIGS. 1-3, an article carrier or storage rack is indicated generally at 10 and is suitably secured to a vehicle surface 12. Article carrier 10 includes a pair of identical side rails 14 disposed on laterally spaced sides of vehicle surface 12. For convenience, only one of the side rails 14 is shown in the drawings and it is understood that a second mirror image side rail is disposed in a transversely spaced and parallel relationship to the side rail shown. Side rails 14 extend longitudinally of vehicle surface 12 and are generally parallel to the longitudinal center line of the vehicle. It is to be understood that the precise shape or configuration of side rail 14 may be varied so as to offer a variety of aesthetically pleasing appearances.

While it is possible to form side rail 14 as a totally integral member, most commonly such side rail is of a multi-part construction and includes end stanchion members 16 and 18 and an intermediate member 20 telescopingly supported within the end stanchions 16 and 18 which assembly gives the impression of an integral side rail. While the base portions of end stanchions 16 and 18 are suitably secured to vehicle surface 12, the remainder of the side rail, and particularly intermediate member 20, is elevated above the vehicle surface.

One or more cross rail members 22 are supported upon side rail 14 and extend transversely of the vehicle surface or normally to the longitudinal center line of the vehicle. As best seen in FIGS. 2 and 3, cross rail 22 is normally hollow and includes an end bracket 24 suitably connected thereto. Like side rail member 20, cross rail member 22 may be die cast, roll formed, or extruded and may be formed of a variety of materials including metals or high strength plastics. As illustrated, end stanchions 16 and 18, side rail member 20, and cross rail member 22 are formed of metal.

Cross rail end bracket 24 may likewise be formed of metal, however, in the illustrated embodiment of FIGS. 1-3, at least the first element or major portion 26 of end bracket 24 is formed of a high strength molded nylon. Bracket element 26 includes a reduced portion 28 adapted to project within the hollow cross rail member 22 and be secured thereto by a suitable screw member 30 extending through a suitable opening in cross rail member 22 and threadably engaging portion 28.

End bracket 24 includes a second element 32 pivotally connected at one end through a suitable pin 34 to the upper bracket element 26. Upper and lower end bracket elements 26 and 32 include suitable surfaces 36 and 38 adapted to coact with a portion of the outer surface of side rail 20 to clampingly retain the cross rail to the side rail.

It is to be understood that the clamping surfaces 36 and 38 of end bracket 24 may be of any suitable shape to enable the surfaces to conform to and engage with any desired exterior surface portion of the side rail member 20. In the modification shown, side rail member 20 is formed with a laterally inwardly projecting lip or ledge 40 which extends longitudinally of the member. As will be illustrated in a subsequent embodiment of the invention, the end bracket clamping surfaces may coact directly with a portion of the outer surface of the side rail without the necessity of utilizing such a lip or ledge.

It is intended that cross rail 22 be both longitudinally adjustable with respect to side rail 14 as well as easily disconnectable completely therefrom. Accordingly, end bracket 24 is provided with means for both adjusting the clamping pressure between the end bracket and the side rail as well as enabling the bracket to be disconnected from the side rail. The means for adjusting end bracket clamping pressure as well as enabling the disconnect of the bracket from the side rail further includes a manually adjustable nut indicated generally at 42 and including an enlarged head portion 44 from which a threaded stem 46 projects. A retainer ring 48 threads over stem portion 46 and is adapted to rotatably retain the nut member 42 to the pivotal bottom element 32 of the end bracket. In order to prevent suitable threads in bracket element 26 from being stripped through use and when employing a plastic material, it is preferable to utilize an internally threaded insert 50 about which the bracket element 26 is molded. Preferably, the insert 50 will be formed of metal such as brass. It is also to be noted that the upper bracket element 26 is larger and of heavier construction than lower element 32 since the former coacts with cross rail member 22 to transmit all vertical loads imposed on carrier 10.

When the cross rail member 22 is in its normally installed and load bearing position on cross rails 14, threaded nut stem 46 is threadably engaged with the insert 50 of upper element 26 of the end bracket. In order to set the longitudinal position of cross rail 22 relative to side rails 14, threaded nut 42 is partially unscrewed or loosened relative to end bracket element 26 to remove or greatly reduce the clamping pressure of surfaces 36 and 38 against side rail lip 40. With the end bracket members 26 and 32 loosened, the cross rail may be manually adjusted along the length of side rail 14 until it is in the desired position to accommodate whatever loads are to be carried upon or within the article carrier. Once the longitudinal position of cross rail 22 is determined, threaded nut 42 is then threaded into end bracket element 26 causing lower element 32 to pivot clockwise around pin 34 and to thereby draw the surfaces 36 and 38 into tightly clamping relationship with lip 40 of side rail 14. Until it is once again necessary to change the longitudinal position of cross rail 22 relative to side rail 14 or to entirely remove the cross rail from the side rail, the end bracket elements 26 and 32 will releasably clamp the cross rail to the side rail.

On those frequent occasions when no articles are being carried upon or within carrier 10 and for reasons of improved fuel economy (i.e. less aerodynamic drag) as well as improving the overall appearance of the car, it is most desirable to be able to quickly and easily remove cross rails 22. When cross rail 22 is to be removed or remounted upon side rail 14, lower element 32 of end bracket 24 is in the open or disconnected position as shown in FIG. 3. In order to achieve the open or disconnect position of FIG. 3, threaded nut member 42 is unscrewed relative to insert 50 of bracket element 26 until the threaded stem is moved totally out of engagement with the threaded bore of insert 50. In this case, bracket element 32 swings about pivot member 34 in a counterclockwise direction to move clamping surface 38 away from the under side of lip 40 and thereby enabling the cross rail and end bracket to be lifted off of or remounted upon side rail 14.

Side rail lip 40 includes a depending edge 41 adapted to be engaged by the side of raised surface 38 to prevent inadvertent disconnection of bracket 24 from side rail 14.

Figure 5:
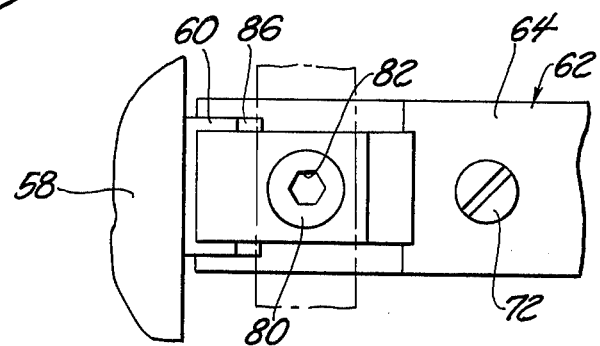
FIG. 5 is a bottom view along lines 5—5 of FIG. 4.

Reference is now made to a second modification of the invention as depicted in FIGS. 4 and 5. In this case, a side rail is indicated generally at 54 and includes an end stanchion 56 and a longitudinally extending side rail member 58. Again in this modification, side rail member 58 includes a transversely projecting lip or ledge 60. A cross rail is indicated generally at 62 and includes a hollow member 64 to which end bracket means 66 is suitably connected. End bracket 66 includes an upper main portion 68, again depicted as being formed of a molded nylon, and which includes a reduced portion 70 adapted to project within the hollow cross rail member 64. The end bracket is retained within the cross rail through a suitable screw member 72.

End bracket 66 includes a lower element 74 adjustably secured to upper element 68 through a threaded screw member 76 adapted to coact with insert 78 in the upper element 68. To illustrate another variation, in this case screw element 76 does not include an exposed head, but rather includes a head portion 80 adapted to be hidden within a recessed or counterbored portion of element 74 with actuation of the screw element being achieved through a suitable insertable tool, not shown, having a hex head adapted to coact with a hexagonal recess 82 in head 80. Lower element 74 has a second enlarged counterbore in order to receive a coiled spring element 84 one end of which seats against the inside of screw element head 80 and the other end of which seats against the upper element 68 and thereby tending to force the lower element 74 away from the upper element 68.

Similar to the modification shown in FIGS. 1–3, and in order to prevent any inadvertent disconnecting of the cross rail 62 from side rail 54, lip 60 includes a downwardly depending edge portion 86 adapted to fit within a correspondingly notched portion 88 of lower element 74. Upper and lower elements 68 and 74 respectively include clamping surfaces 90 and 92 adapted to clampingly engage the upper and lower surfaces of side rail lip 60.

Here again, if it is desired to longitudinally adjust cross rail 62 relative to side rail 54, threaded screw element 76 is unthreaded to allow relative separation between end bracket elements 68 and 74 thereby enabling longitudinal adjustment of the cross rail relative to the side rail. At such time as the longitudinal position of the cross rail 62 is determined, then, screw element 76 is once again threaded into insert 78 thereby clampingly retaining end bracket members 68 and 74 to side rail lip 60.

In this modification, removal of the cross rail 62 and bracket 68 from side rail 54 is accomplished by unthreading screw element 76 relative to end bracket element 68 until the notched portion 88 of lower element 74 is moved below lip edge 86 by spring 84 sufficiently to allow member 74 to be rotated from beneath the lip 60. The rotated or disconnect position of lower element 74 is indicated in the dotted line position of FIG. 5. Having pivoted lower bracket element 74 from beneath side rail lip 60, the cross rail and end bracket may once again be lifted from or remounted upon the side rail.

Figure 6:
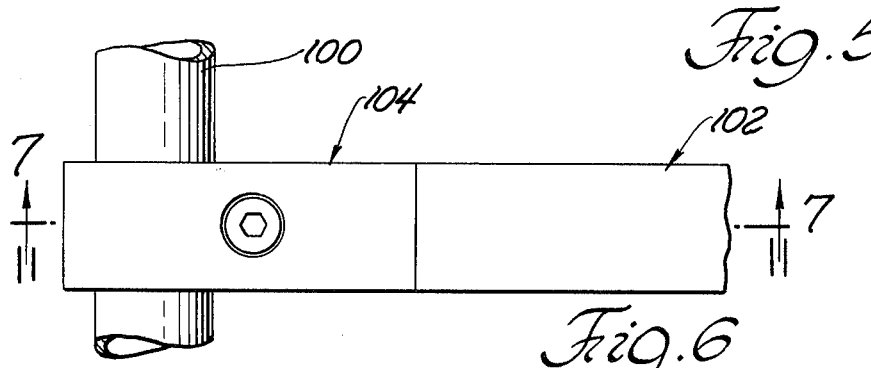
FIG. 6 is a partial plan view of a third modification of the invention.
Figure 7:
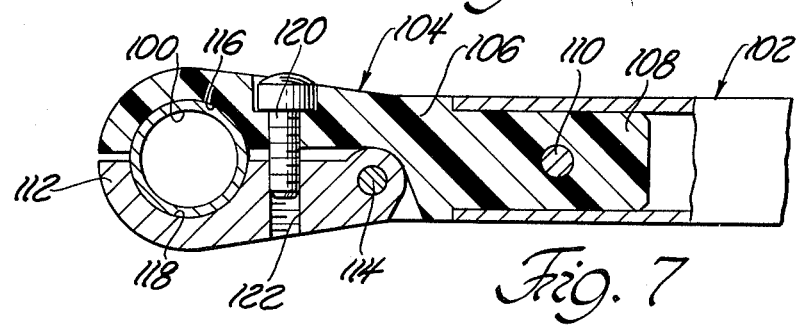
FIG. 7 is a side elevational view along lines 7—7 of FIG. 6.

A third modification of the invention is shown in FIGS. 6 and 7. In this case, a tubular side rail is indicated at 100 and upon which cross rail 102 and end bracket 104 are supported. In the modification of FIGS. 6 and 7, the end stanchions are not shown but it is to be assumed that such are provided and support the side rail and cross rails in a spaced relationship above the supporting vehicle surface. End bracket 104 includes a main portion or upper member 106 having a reduced end section 108 adapted to project within the hollow cross rail member 102. Upper element 106 is retained within the cross rail through a suitable screw element 110.

As with the first modification, a lower element 112 is pivotally secured to the upper element 106 through a suitable pin member 114. Upper and lower elements 106 and 112 respectively include corresponding arcuate surfaces 116 and 118 adapted to engage with a portion of the outer surface of tubular side rail 100.

To vary the clamping pressure between bracket element 106 and 112 with side rail 100, a recessed screw element 120 is provided and is adapted to threadably engage with a threaded bore 122 in lower bracket element 112. A similar but unthreaded bore is provided in upper bracket element 106 so that threading the screw element 120 in one direction increases the side rail clamping pressure while rotation of the screw element in the opposite direction loosens the bracket element enabling the cross rail 102 to be longitudinally adjusted along the length of side rail 100.

In order to either remove or remount cross rail 102 and end bracket 104 with respect to side rail 100, screw element 120 is rotated so as to become disengaged with threaded bore 122 in lower element 112 thereby permitting element 112 to rotate about pin 114 and move clear of side rail 100. In the disconnected position of element 112, the bracket 104 is clear of side rail 100 enabling vertical removal or remounting of the cross rail relative to the side rail.

As with the case of the second modification, screw element 120 has a hexagonal recess formed in the head thereof and which is adapted to receive a correspondingly shaped tool for actuation of the screw element.

Depending on the appearance desired as well as providing the easiest access by a user, the threaded means for adjusting the lower bracket element relative to the upper bracket element may include an enlarged head for actuation without a tool or a recessed and tool operated head. Likewise, access to the threaded means may be from the top or bottom.

It is apparent that other modifications of the invention may be made within the intended scope of the invention as set forth in the hereinafter appended claims.

What is claimed is:

1. An article carrier of the type adapted to be mounted on an exterior vehicle surface that extends generally horizontally, said carrier including a pair of side rails supported above the generally horizontal vehicle surface, each side rail having an outer surface, a cross rail extending between said side rails, and a pair of bracket devices for supporting the ends of the cross rail for longitudinal adjustment along said side rails, the improvement wherein each bracket device includes;

a first member non-movably fixed to said cross rail and adapted to overlay a portion of the associated side rail outer surface to support all vertical loads imposed on the cross rail;

a second member movable with respect to the first member and adapted to underlay a portion of the associated side rail outer surface in an opposed relationship to the first member; and means for adjustably connecting said first and second members to adjustably clamp said members to said side rail, and said connecting means permitting said second member to move out of its underlaying position relative to said side rail whereby the cross rail can be removed from the side rail; and wherein each side rail is provided with a lip portion projecting outwardly from the outer surface thereof substantially throughout the length thereof, and the first and second members of the bracket device associated with each side rail clampingly engaging the lip thereof to secure the cross rail to the side rail.

2. A carrier as in claim 1 wherein the cross rail has a hollow construction, and the first member of each bracket device having an inwardly extending portion fixedly received within the cross rail and also having an outwardly extending portion which overlays the associated side rail.

3. A carrier as in claim 2 wherein each bracket device includes a pivotal connection having a pivotal axis about which the second member is supported for movement with respect to the first member.

4. A carrier as in claim 3 wherein the connecting means of each bracket device is located between the pivotal axis thereof and the associated side rail.

5. A carrier as in claim 4 wherein the connecting means of each bracket device comprises a threadable connection that extends between the first and second members to provide clamping securement thereof to the associated side rail.

6. A carrier as in claim 2 wherein the connecting means of each bracket device mounts the second member thereof on the first member for movement from below the associated side rail to permit removal of the cross rail.

7. A carrier as in claim 6 wherein the connecting means of each bracket device includes a threaded member that extends between the first and second members thereof and also includes a helical spring that receives the threaded member and extends between the first and second members.

8. A carrier as in claim 1 wherein each side rail lip includes a lateral inner end having a flange that projects vertically therefrom substantially throughout the length thereof, and one of the members of each bracket device including a notched portion that receives the associated side rail lip to secure the cross rail to the side rail.

9. A carrier as in claim 1, 3, or 6 wherein each side rail has a tubular construction.

10. A carrier as in claim 9 wherein the tubular side rails each have a round cross section.

* * * * *